(12) United States Patent
Bissett et al.

(10) Patent No.: US 6,473,869 B2
(45) Date of Patent: Oct. 29, 2002

(54) FAULT RESILIENT/FAULT TOLERANT COMPUTING

(75) Inventors: Thomas D. Bissett, Kingston, RI (US); Paul A. Leveille, Grafton; Erik Muench, Groveland, both of MA (US)

(73) Assignee: Marathon Technologies Corporation, Boxborough, MA (US)

( * ) Notice: Subject to any disclaimer, the term of this patent is extended or adjusted under 35 U.S.C. 154(b) by 0 days.

(21) Appl. No.: 09/925,487

(22) Filed: Aug. 10, 2001

(65) Prior Publication Data

US 2002/0026604 A1 Feb. 28, 2002

Related U.S. Application Data

(63) Continuation of application No. 09/190,269, filed on Nov. 13, 1998, now Pat. No. 6,279,119.
(60) Provisional application No. 60/065,790, filed on Nov. 14, 1997.

(51) Int. Cl.[7] .................................................. G06F 11/00
(52) U.S. Cl. .................... 714/12; 712/214; 709/400; 713/501
(58) Field of Search ................................. 714/12, 9, 11, 714/10, 23; 712/200, 229, 214; 711/100, 106; 709/248, 400; 710/22, 267; 713/501, 600; 703/23; 365/222

(56) References Cited

U.S. PATENT DOCUMENTS

| 4,531,185 A | 7/1985 | Haplern et al. |
| 4,634,110 A | 1/1987 | Julich et al. |
| 4,907,228 A | 3/1990 | Brucker et al. |
| 4,933,940 A | 6/1990 | Walter et al. |
| 4,937,741 A | 6/1990 | Harper et al. |
| 5,226,152 A | 7/1993 | Klug et al. |
| 5,255,367 A | 10/1993 | Bruckert et al. |
| 5,276,823 A | 1/1994 | Cutts, Jr. et al. |
| 5,295,258 A | 3/1994 | Jewett et al. |
| 5,317,726 A | 5/1994 | Horst |
| 5,600,784 A | 2/1997 | Bissett et al. |
| 5,615,403 A | 3/1997 | Bissett et al. |
| 5,689,689 A | 11/1997 | Meyers et al. |
| 5,751,932 A | 5/1998 | Horst et al. |
| 5,867,682 A | * 2/1999 | Witt et al. |
| 5,956,474 A | 9/1999 | Bissett et al. |
| 6,036,685 A | 3/2000 | Bissett et al. |
| 6,279,119 B1 | * 8/2001 | Bissett et al. |

FOREIGN PATENT DOCUMENTS

| EP | 0 372 580 a2 | 6/1990 | ........... G06F/11/16 |
| EP | 0 411 802 A2 | 2/1991 | ........... G06F/11/16 |
| EP | 0 286 856 A1 | 10/1998 | ........... G06F/11/16 |
| WO | WO 93/09494 | 5/1993 | ........... G06F/11/16 |
| WO | WO 99/26133 | 5/1999 | ............. G06F/9/00 |

OTHER PUBLICATIONS

Marathon Technologies Corp., "Marathon Technologies Corp.: Fault Tolerant Systems—A White Pater"; Apr. 3, 1997; pp1–11.
Marathon Technologies Corp., MIAL Kits, MIAL Server Kits.
Marathon Paper, "Marathon Technologies Now Shipping Industry First Fault Tolerant Windows NT Server Solution", Joost Verhofstad et al.
International Search Report dated May 27, 1999.
Marathon Technologies Corp., Mial 1, Fault Tolerant Server I/O Kit.

* cited by examiner

*Primary Examiner*—Gopal C. Ray
(74) *Attorney, Agent, or Firm*—Fish & Richardson P.C.

(57) ABSTRACT

A fault tolerant/fault resilient computer system includes at least two compute elements connected to at least one controller. Each compute element has clocks that operate asynchronously to clocks of the other compute elements. The compute elements operate in a first mode in which the compute elements each execute a first stream of instructions in emulated clock lockstep, and in a second mode in which the compute elements each execute a second stream of instructions in instruction lockstep. Each compute element may be a multi-processor compute element.

14 Claims, 9 Drawing Sheets

FAULT RESILIENT/FAULT TOLERANT COMPUTING

This application is a continuation of U.S. application Ser. No. 09/190,269, filed Nov. 13, 1998, which issued on Aug. 21, 2001 as U.S. Pat. No. 6,279,119, and was a utility application claiming priority to U.S. Provisional Application No. 60/065,790, filed Nov. 14, 1997.

TECHNICAL FIELD

The invention relates to maintaining synchronized execution by processors in fault resilient/fault tolerant computer systems.

BACKGROUND

Computer systems that are capable of surviving hardware failures or other faults generally fall into three categories: fault resilient, fault tolerant, and disaster tolerant.

Fault resilient computer systems can continue to function, often in a reduced capacity, in the presence of hardware failures. These systems operate in either an availability mode or an integrity mode, but not both. A system is "available" when a hardware failure does not cause unacceptable delays in user access, which means that a system operating in an availability mode is configured to remain online, if possible, when faced with a hardware error. A system has data integrity when a hardware failure causes no data loss or corruption, which means that a system operating in an integrity mode is configured to avoid data loss or corruption, even if the system must go offline to do so.

Fault tolerant systems stress both availability and integrity. A fault tolerant system remains available and retains data integrity when faced with a single hardware failure, and, under some circumstances, when faced with multiple hardware failures.

Disaster tolerant systems go beyond fault tolerant systems. In general, disaster tolerant systems require that loss of a computing site due to a natural or man-made disaster will not interrupt system availability or corrupt or lose data.

All three cases require an alternative component that continues to function in the presence of the failure of a component. Thus, redundancy of components is a fundamental prerequisite for a disaster tolerant, fault tolerant or fault resilient system that recovers from or masks failures. Redundancy can be provided through passive redundancy or active redundancy, each of which has different consequences.

A passively redundant system, such as a checkpoint-restart system, provides access to alternative components that are not associated with the current task and must be either activated or modified in some way to account for a failed component. The consequent transition may cause a significant interruption of service. Subsequent system performance also may be degraded. Examples of passively redundant systems include stand-by servers and clustered systems. The mechanism for handling a failure in a passively redundant system is to "fail-over", or switch control, to an alternative server. The current state of the failed application may be lost, and the application may need to be restarted in the other system. The fail-over and restart processes may cause some interruption or delay in service to the users. Despite any such delay, passively redundant systems such as stand-by servers and clusters provide "high availability" and do not deliver the continuous processing usually associated with "fault tolerance."

An actively redundant system, such as a replication system, provides an alternative processor that concurrently processes the same task and, in the presence of a failure, provides continuous service. The mechanism for handling failures is to compute through a failure on the remaining processor. Because at least two processors are looking at and manipulating the same data at the same time, the failure of any single component should be invisible both to the application and to the user.

The goal of a fault tolerant system is to produce correct results in a repeatable fashion. Repeatability ensures that operations may be resumed after a fault is detected. In a checkpoint-restart system, this entails rolling back to a previous checkpoint and replaying the inputs again from a journal file. In a replication system, repeatability results from simultaneous operation on multiple instances of a computer.

Many fault tolerant designs are known for single processor systems. There also are a few known fault tolerant, symmetric multi-processing ("SMP") systems. The extra complexity associated with providing fault tolerance in an SMP system causes problems for many traditional approaches to fault tolerance.

For a checkpoint-restart system, the checkpoint information is somewhat more complex, but the recovery algorithm remains basically the same. Repeatability can be loosely interpreted to permit the replay of system operation to occur differently than the original system operation. In other words, the allocation of workload between SMP processors on the replay does not have to follow the allocation that was being followed when the fault occurred. The order of the inputs must be preserved, but the relative timing of the inputs to each other and to the instruction streams running on the different processors does not need to be preserved.

Under this loose repeatability standard, a replay is valid as long as the results produced by the replay are proper for the sequence of inputs. An example is an airline reservation system with multiple customers (e.g., Mr. Smith and Ms. Jones) competing for the last seat. Due to input timing and processor scheduling, Ms. Jones gets the seat. However, before the result is posted, a fault occurs. On the replay, Mr. Smith gets the seat. Though producing a different result, the replay is valid since there is no cognizable problem associated with the change in result (i.e., Ms. Jones will never know she almost got the seat).

SMP adds considerable complexity to replication systems. Corresponding processors in corresponding systems must produce the same results at the same time. The input timing must be precisely preserved with respect to the multiple instruction streams. No difference between processor arbitration cycles is allowed, because such a difference can affect who gets what resource first. Making an SMP system with replication requires control of all aspects of the system that can affect the timing of input data and the arbitration between processors.

For these reasons, fault tolerant SMP systems generally are produced using the checkpoint-restart approach. In such systems, the application and operating system software must be specially designed to support checkpoints.

SUMMARY

In one general aspect, a fault tolerant/fault resilient computer system includes at least two compute elements connected to at least one controller. Each of the compute elements has clocks that operate asynchronously to clocks of the other compute elements. The compute elements operate in a first mode in which the compute elements each execute a first stream of instructions in emulated clock lockstep. Clock lockstep operation requires the compute elements to perform the same sequence of instructions in the same order, with each instruction being performed in the same clock cycle by each compute element. The compute elements also operate in a second mode in which the compute elements each execute a second stream of instructions in instruction lockstep. Instruction lockstep operation requires the compute elements to perform the same sequence of instructions in the same order, but does not require the compute elements to perform the instructions in the same clock cycle.

Implementations of the computer system may include one or more of the following features. For example, each compute element may be a multi-processor compute element, such as a symmetric multi-processor (SMP) compute element. Each compute element may be implemented using an industry standard motherboard. The system may be configured to deactivate all but one of the processors of each compute element when the compute elements are operating in the second mode.

The first stream of instructions may implement operating system and application software, while the second stream of instructions implements lockstep control software. The operating system and application software may be unmodified software configured for use with computer systems that are not fault tolerant.

Each compute element may include one or more processors, memory, and a connection to the controller. The compute elements may be configured so that refresh operations associated with the memory are synchronized with execution of operations by the processor. The system also may be configured to initiate DMA transfers to the memory when the compute elements are operating in the second mode and to execute initiated DMA transfers when the compute elements are operating in the first mode.

The system may synchronize the compute elements by copying contents of the memory of a first compute element to the memory of a second compute element, and resetting the processors of the first and second compute elements in a way that does not affect the memories of the compute elements.

The compute elements may transition from the first mode of operation to the second mode of operation in response to an interrupt. For example, the interrupt may be a performance counter interrupt generated by the compute element after the occurrence of a fixed number of clock cycles, such as processor clock cycles or bus clock cycles. The interrupt also may be generated after the execution of a fixed number of instructions. When the compute elements are multi-processor compute elements having primary processors and one or more secondary processors, the primary processor may be configured to halt operation of the secondary processors in response to the interrupt.

Each compute element may generate an interrupt during the transition from the second mode of operation to the first mode of operation. This interrupt serves to align the processing by the compute element with a clocking structure of the compute element. Typically, the interrupt is synchronized with a clock having the lowest frequencies of the clocking structure.

The system may redirect I/O operations by the compute elements to the controller. The system also may include a second controller connected to the first controller and to the two compute elements. The first controller and a first compute element may be located in a first location and the second controller and a second compute element may be located in a second location, in which case the system also may include a communications link connecting the first controller to the second controller, the first controller to the second compute element, and the second controller to the first compute element. The first location may be spaced from the second location by more than 5 meters, by more than 100 meters, or even by a kilometer or more.

A benefit of creating a fault resilient fault tolerant SMP system using replication is that the system can run standard application and operating system software, such as the Windows NT operating system available from Microsoft Corporation. In addition, the system can do so using industry-standard processors and motherboards, such as motherboards based on Pentium series processors available from Intel Corporation.

Other features and advantages will be apparent from the following description, including the drawings, and from the claims.

DETAILED DESCRIPTION

Figure 1:
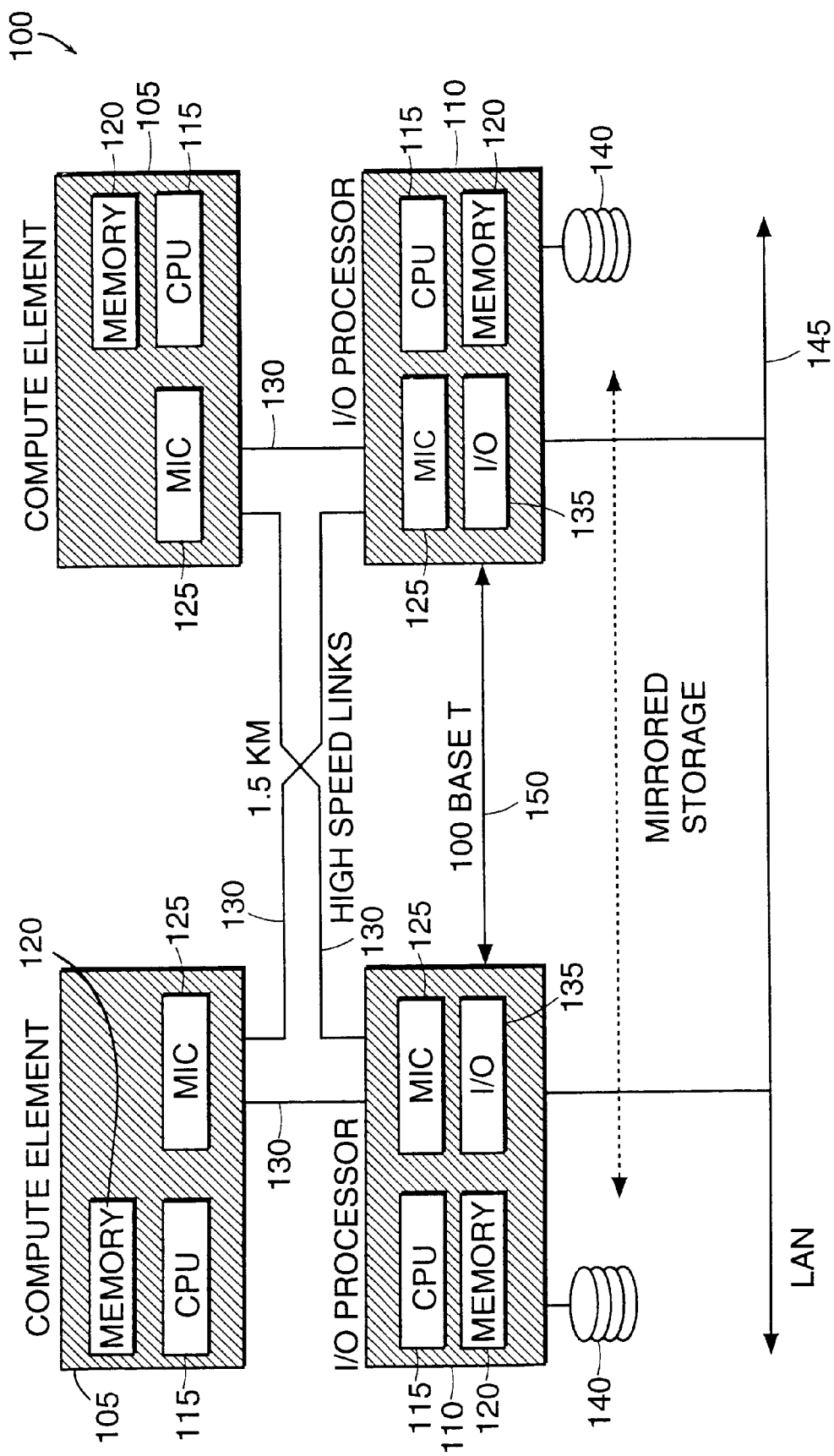
FIGS. 1 and 2 are block diagrams of a fault resilient/fault tolerant uniprocessor computer system.

The fault tolerant systems described below emulate fully-phase-locked operation of multiple instances of a compute element. This should be contrasted to prior systems that operated multiple instances of a compute element in instruction lockstep, such as the Endurance 4000 system available from Marathon Technologies Corporation of Boxboro, Mass. Instruction lockstep operation occurs when multiple instances of a compute element perform the same sequence of instructions in the same order. Fully-phase-locked operation, which also may be referred to as clock lockstep operation, occurs when multiple instances of a compute element perform the same sequence of instructions in the same order, with each instruction being performed in the same clock cycle by each instance of the compute element.

In the Endurance 4000 system, the instances of a compute element operate in instruction stream lockstep. Each compute element executes the same sequence of instructions prior to producing an output. The time needed to execute the instruction stream varies due to the uncontrolled past history of each compute element. For example, caches, table lookahead buffers, branch prediction logic, speculative execution logic, and execution pipelines of the compute elements can have different initial values, which, even though the instruction streams being executed are the same, result in varying execution times.

Instruction lockstep operation may result in failures when the compute elements are SMP servers. In such a system, each compute element has multiple processors, each with its own instruction stream. The instruction streams are arbitrating for shared resources. This arbitration must be resolved identically in both compute elements for redundant operation. Instruction lockstep operation does not provide a tight enough control over the processors and the memory to guarantee the same arbitration resolution in both compute elements.

Clock lockstep operation may be achieved by using a common oscillator to provide clocks to all instances of the compute element. However, such an implementation may be unsuited for fault tolerant operation because it includes a single component, the common oscillator, the failure of which will cause failure of the entire system.

Emulated clock lockstep operation avoids the single point of failure and is achieved using the techniques described below. Emulated clock lockstep operation offers the considerable additional benefit of permitting the different instances of a compute element to be separated by distances of up to a kilometer or more.

An emulated-clock-lockstep, non-SMP, fault tolerant system is described below. This description is followed by description of a fault tolerant SMP system using replication and emulated-clock-lockstep operation. In both systems, the basic approach is to design a system in which multiple instances of a compute element are initialized into exactly the same state and then provided with exactly the same input stimuli from a synchronous I/O subsystem. This causes each instance to produce exactly the same result.

To progress a fault tolerant non-SMP (uni-processor) implementation to a fault resilient/fault tolerant SMP implementation, each processor is replaced by several processors and an arbitration unit. Any time that a processor needs access to anything beyond its internal cache (e.g., memory or I/O), the processor uses the arbitration unit to arbitrate for the external bus that connects the processors together. Given that the arbitration units are finite state engines initialized to the same state, they will follow the same sequence of arbitrations as long as the processors are functioning correctly.

Uni-Processor (Non-SMP) System

FIG. 1 illustrates a fault tolerant, non-SMP system 100 that emulates clock lockstep operation. In general, all computer systems perform two basic operations: (1) manipulating and transforming data, and (2) moving the data to and from mass storage, networks, and other I/O devices. The system 100 divides these functions, both logically and physically, between two separate processors. For this purpose, each half of the system 100, called a tuple, includes a compute element ("CE") 105 and an I/O processor ("IOP") 110. The compute element 105 processes user application and operating system software. I/O requests generated by the compute element 105 are redirected to the I/O processor 110. This redirection is implemented at the device driver level. The I/O processor 110 provides I/O resources, including I/O processing, data storage, and network connectivity. The I/O processor 110 also controls synchronization of the compute elements.

The system 100 is fault tolerant in that it continues to operate transparently to its users in the presence of any single hardware failure. The system 100 emulates a traditional computing environment by partitioning it into two components. The compute element 105 handles all compute tasks for the operating system and any applications. The I/O processor 110 handles all I/O devices. Thus, the I/O processor handles all of the asynchronous activities associated with a computer, while the compute element handles all of the synchronous compute activities.

To provide the necessary redundancy for fault tolerance, the system 100 includes at least two compute elements 105 and at least two I/O processors 110. The two compute elements 105 operate in lockstep while the two I/O processors 110 are loosely coupled. The I/O processors 110 feed both compute elements 105 the exact same data at a controlled place in the instruction streams of the compute elements. The I/O processors verify that the compute elements generate the same I/O operations and produce the same output data at the same time. The I/O processors also cross check each other for proper completion of requested I/O activity.

The system 100 uses a software-based approach in a configuration based on inexpensive, industry standard processors. For example, the compute elements 105 and I/O processors 10 may be implemented using Pentium Pro processors available from Intel Corporation. The system may run unmodified, industry-standard operating system software, such as the Windows NT operating system available from Microsoft Corporation, as well as industry-standard applications software. This permits a fault tolerant system to be configured by combining off-the-shelf, Intel Pentium Pro-based servers from a variety of manufacturers, which results in a fault tolerant or disaster tolerant system with low acquisition and life cycle costs.

Each compute element 105 includes a processor 115, memory 120, and an interface card 125 (also referred to as a Marathon interface card, or MIC). The interface card 125 includes drivers for communicating with two I/O processors simultaneously, as well as comparison and test logic that assures results received from the two I/O processors are identical. In the fault tolerant system 100, the interface card 125 of each compute element 105 is connected by high speed links 130, such as fiber optic links, to interface cards 125 of the two I/O processors 110. The interface cards 125 may be implemented as PCI-based adapters.

Each I/O processor 110 includes a processor 115, memory 120, an interface card 125, and I/O adapters 135 for connection to I/O devices such as a hard drive 140 and a network 145. As noted above, the interface card 125 of each I/O processor 110 is connected by high speed links 130 to the interface cards 125 of the two compute elements 105. In addition, a high speed link 150, such as a private ethernet link, is provided between the two I/O processors 110.

All I/O task requests from the compute elements 105 are redirected to the I/O processors 110 for handling. The I/O processor 110 runs specialized software that handles all of the fault handling, disk mirroring, system management, and resynchronization tasks required by the system 100. By using a multitasking operating system, such as Windows NT, the I/O processor 110 may run other, non-fault tolerant applications. In general, a compute element may run Windows NT Server as an operating system while, depending on the way that the I/O processor is to be used, an I/O processor may run either Windows NT Server or Windows NT Workstation as an operating system.

The two compute elements 105 run lockstep control software, also referred to as quantum synchronization software, and execute the operating system and the applications in emulated clock lockstep. Disk mirroring takes place by duplicating writes on the disks 140 associated with each I/O processor. If one of the compute elements 105 should fail, the other compute element 105 keeps the system running with a pause of only a few milliseconds to remove the failed compute element 105 from the configuration. The failed compute element 105 then can be physically removed, repaired, reconnected, and turned on. The repaired compute element then is brought back automatically into the configuration by transferring the state of the running compute element to the repaired compute element over the high speed links and resynchronizing. The states of the operating system and applications are maintained through the few seconds it takes to resynchronize the two compute elements so as to minimize any impact on system users.

If an I/O processor 110 fails, the other I/O processor 110 continues to keep the system running. The failed I/O processor then can be physically removed, repaired and turned back on. Since the I/O processors are not running in lockstep, the repaired system may go through a full operating system reboot, and then may be resynchronized. After being resynchronized, the repaired I/O processor automatically rejoins the configuration and the mirrored disks are re-mirrored in background mode over the private connection 150 between the I/O processors. A failure of one of the mirrored disks is handled through the same process.

The connections to the network 145 also are fully redundant. Network connections from each I/O processor 110 are booted with the same address. Only one network connection is allowed to transmit messages, while both are allowed to receive messages. In this way, each network connection monitors the other through the private ethernet. Should either network connection fail, the I/O processors will detect the failure and the remaining connection will carry the load. The I/O processors notify the system manager in the event of a failure so that a repair can be initiated.

While FIG. 1 shows both connections on a single network segment, this is not a requirement. Each I/O processor's network connection may be on a different segment of the same network. The system also accommodates multiple networks, each with its own redundant connections. The extension of the system to disaster tolerance requires only that the connection between the tuples be optical fiber or a connection having compatible speed. With such connections, the tuples may be spaced by distances of a kilometer or more. Since the compute elements are synchronized over this distance, the failure of a component or a site will be transparent to the users.

Figure 2:
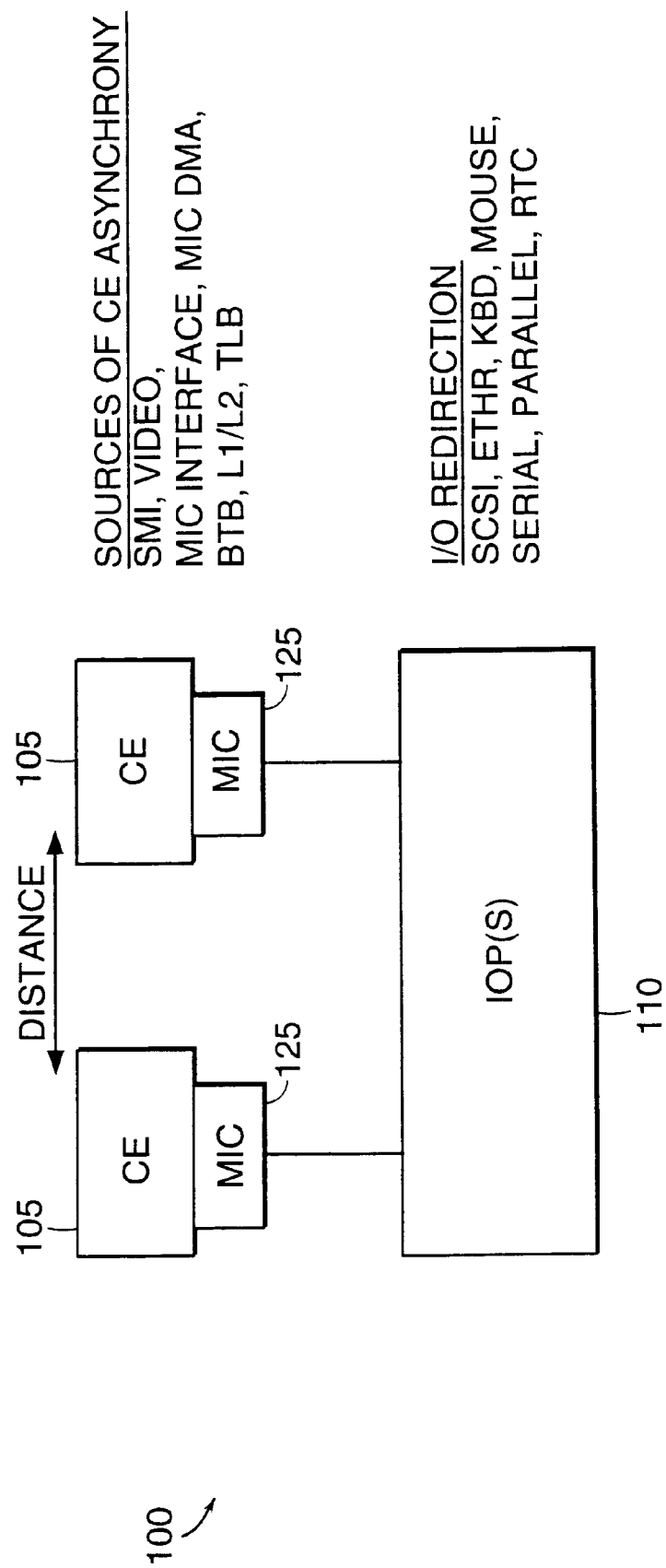

FIG. 2 provides a summarized view of the system 100 of FIG. 1. The system includes redundant compute elements 105 ("CEs") and I/O processors 110 ("IOPs"). Each CE 105 is responsible for all computing and may be implemented using an industry standard motherboard. Each IOP 110 is responsible for access to I/O devices, and for system control. The IOPs run asynchronously of each other and verify that the CEs are performing the same operations in the same order. The IOPs also track each other's I/O completion to ensure that no I/O is lost.

The CEs generate the same outputs in the exact same sequence, and run in emulated clock lockstep, even though the CE clocks are asynchronous to each other. The CEs are initialized to the same state and are fed consistent inputs at exactly the same time. The CEs are periodically realigned using a self-generated interrupt that is related to the occurrence of a quantum of clock cycles (e.g., 100,000 clock cycles) and is referred to as a quantum interrupt ("QI"). By contrast, the prior Endurance 4000 system used QIs related to the completion of a quantum of instructions. All inputs to the CEs are delivered at either an output window or after the completion of an instruction quantum. Both of these points are guaranteed to occur at the same point in the instruction streams of the CEs. The approach employed by the Endurance 4000 system is described in U.S. Pat. Nos. 5,600,784 and 5,615,403, both of which are incorporated by reference.

Multi-Processor (SMP) System

Figure 3:
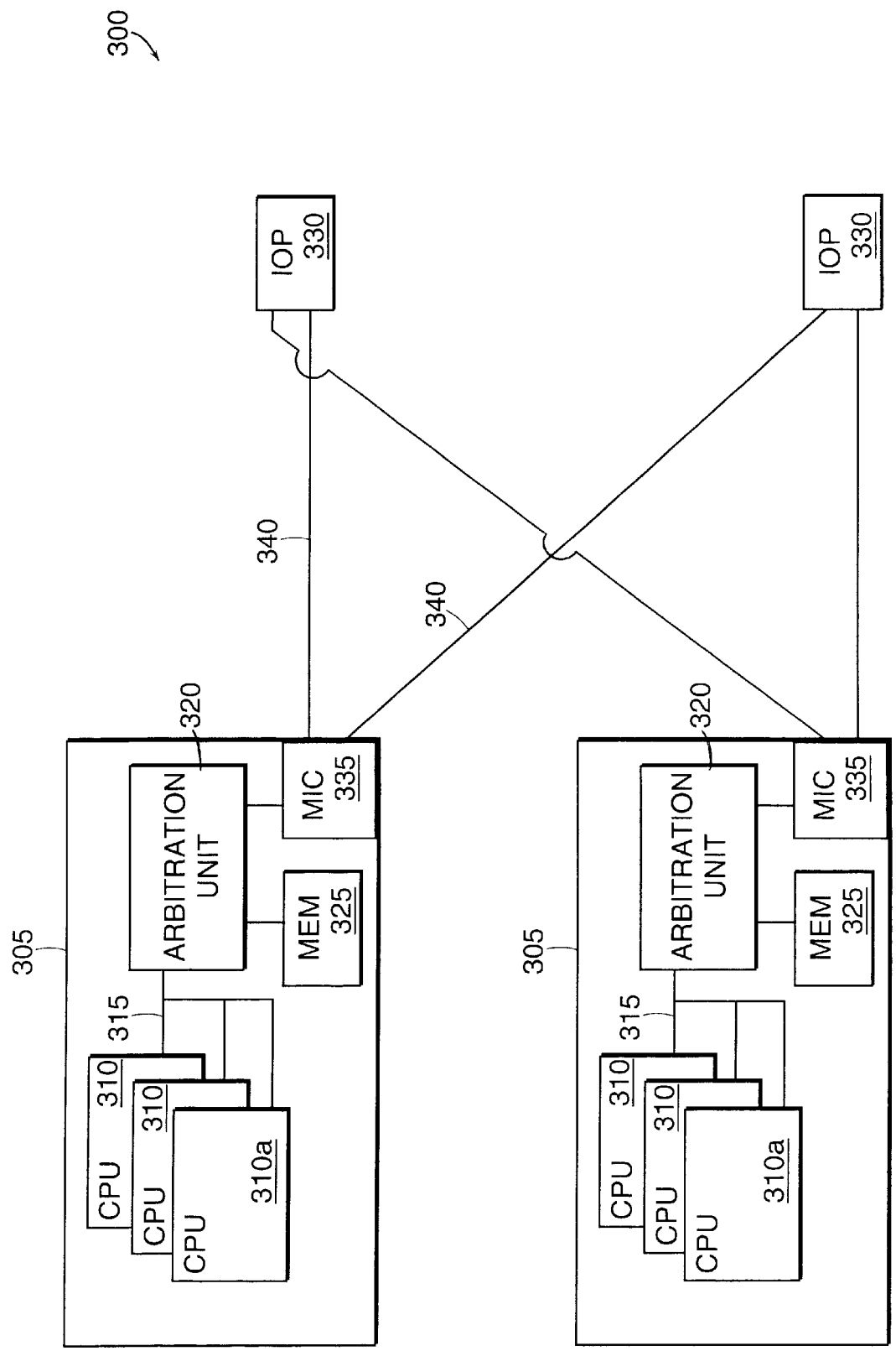
FIG. 3 is a block diagram of a fault resilient/fault tolerant multi-processor computer system.

FIG. 3 illustrates a fault resilient/fault tolerant, symmetric multi-processing ("SMP") system 300. Each CE 305 of the system 300 includes a collection of processors 310 connected by a common processor bus 315 and an arbitration unit 320. The processors use the bus 315 and arbitration unit 320 to access a shared memory 325, and to access two IOPs 330 through an interface card 335 and high speed data links 340.

The IOPs 330 operate identically to the IOPs 110 of the system 100. Thus, the IOPs handle all I/O task requests from the processors 310 and run specialized software that handles all of the fault handling, disk mirroring, system management, and resynchronization tasks required by the system 300.

One processor 310 (identified as processor 310a) of each CE 305 serves as a primary processor and runs lockstep control software in addition to executing an operating system and applications in emulated clock lockstep with the other CE. The remaining processors in each CE 305 execute the operating system and applications in emulated clock lockstep with the other CE.

Figure 4:
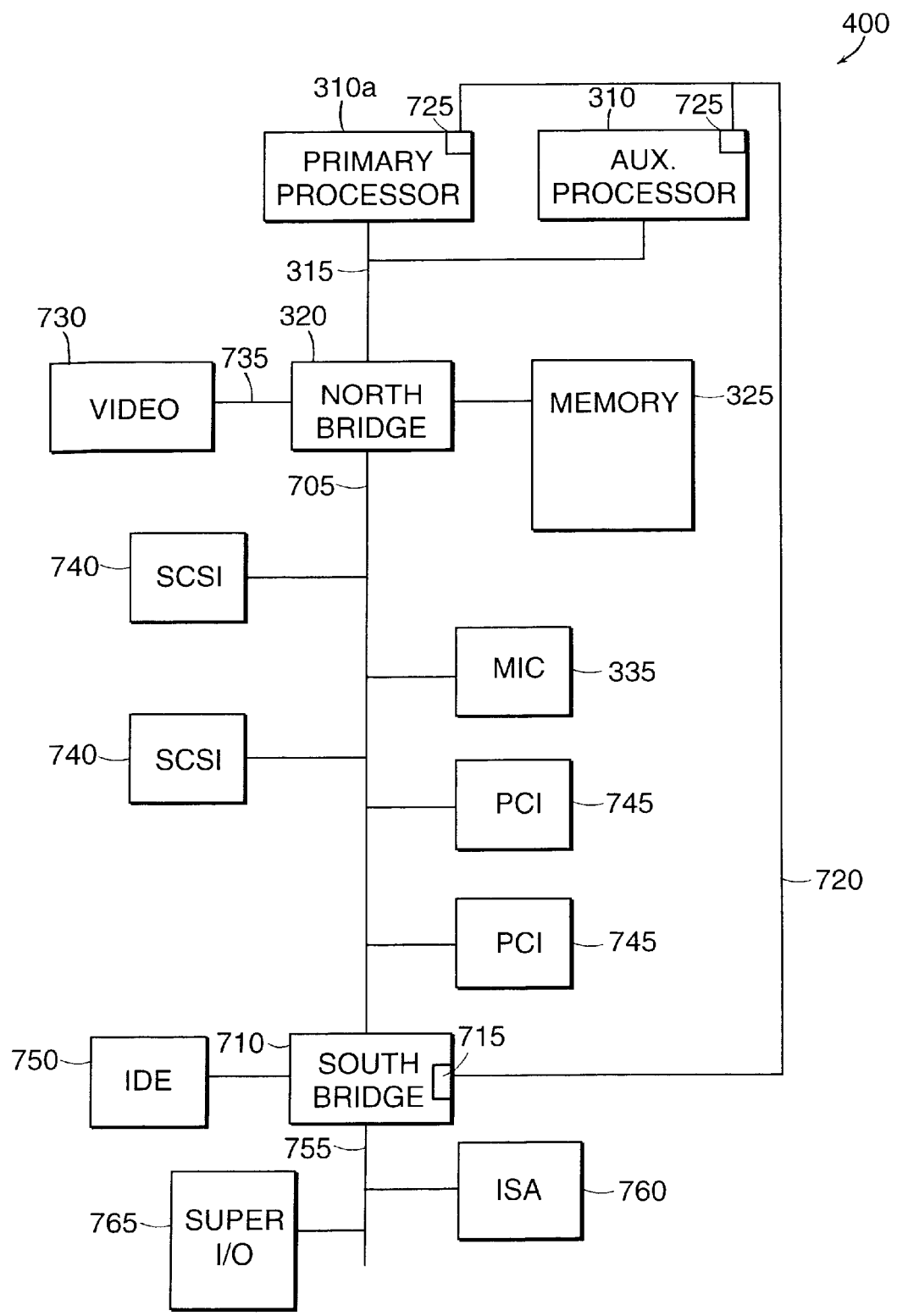
FIG. 4 is a block diagram of a motherboard.

Referring to FIG. 4, a motherboard 400 for use in a CE 305 of the system 300 includes two or more processors 310. Each processor may operate at a clock speed of, for example, 300 MHz or 350 Mhz. The processors 310 are interconnected and connected to the arbitration unit 320 by the bus 315, which is also referred to as the processor bus or the front side bus ("FSB"). The FSB typically operates at a clock speed of 100 MHz. The arbitration unit 320 is commonly referred to as the North Bridge, since it serves as a bridge from the processor bus 315 to the memory 325 and to the PCI bus 705. The PCI bus 705 typically is a 32 bit bus operating at 33 MHz or a 64 bit bus operating at 66 Mhz. The interface card 335 is implemented as a PCI device connected to the PCI bus 705.

The PCI bus 705 is also connected to another component, which is commonly referred to as the South Bridge 710. The South Bridge includes an advanced peripheral interrupt controller ("APIC") 715 that provides interrupts to the processors 310 on an APIC bus 720. The processors 310 include their own APICs 725 that receive the interrupts. The APIC bus may be, for example, a 16.6 MHz bus.

The motherboard 700 may be implemented using an industry standard motherboard. In this case, the motherboard 700 also may include a number of components that, though standard on the motherboard, are not used by the system 300. These components include a video card 730 connected to the North Bridge 320 by an AGP bus 735 (or by the PCI bus); one or more SCSI controllers 740 connected to the PCI bus 705; one or more PCI devices 745 connected to the PCI bus 705; an IDE drive controller 750 connected to the South Bridge 710; an ISA (16 bit, 8 Mhz) or EISA (32 bit, 8 Mhz) bus 755 connected to the South Bridge 710; one or more ISA or EISA devices 760 connected to the bus 755; and a super I/O controller 765 connected to the bus 755 to provide keyboard, mouse, and floppy drive support, as well as parallel and serial ports. These components, if present, are not used by the CE 305.

Marathon's prior Endurance 4000 system provided a fault tolerant structure in which processors were kept in lockstep while disregarding time skew. In essence, the time difference between processors was not important, assuming asynchrony between processors did not affect instruction lockstep. Memory refresh and DMA interactions, which had no impact on the lockstep of the processors, did affect the timing asynchrony. Video processing had both a timing and an instruction component. Care was taken to ensure that video and quantum processing created neither instruction nor data divergence.

When progressing from a uni-processor design to an SMP design, the addition of one or more processors in each CE impacts both timing and instruction execution. The multiple processors interact with each other directly and indirectly. The direct interaction is through SMP features provided by the processors, such as the HALT instruction and interprocessor interrupts provided by the Intel Pentium Pro processor. The indirect interaction is through formal and informal semaphore mechanisms. Provided that the clock structure and processor state are sufficiently coordinated, these semaphores align themselves.

Referring again to FIG. 3, the system 300, like the system 100, achieves fault tolerance by clock phase lockstep operation by the two CEs. Given two CEs in clock phase lockstep and synchronous control of all inputs to the CEs, the CEs will execute exactly the same instruction stream at precisely the same time. This model avoids any need to understand and control all operations that are used by applications when dealing with an SMP system.

As previously noted, the effect of clock phase lockstepped CEs may be produced without actually locking the clocks of the CEs together. Clock phase lockstep guarantees that every operation of a CE is started with exactly the same clock alignment in each CE without ever having to do anything to maintain that alignment once the initial lock is established. The effect of CE clock alignment can be produced using asynchronous CEs provided that a realignment is done whenever an operation that could cause misalignment of the CEs occurs. Thus, to achieve the effect of CE clock alignment, the system 300 controls the CEs to behave like automata synchronizes the CEs to the same initial conditions, prevents divergence of the CEs due to asynchronous behavior, and periodically realigns the CEs.

The CEs generally operate in two modes. The first mode is used for normal processing of applications and operating system software. In this mode, the CEs operate in emulated clock lockstep. The second mode is used during realignment of the CEs and other system-level operations. In this mode, the CEs operate in instruction lockstep.

1. CE Automata Behavior

It is relatively easy to constrain the two CE motherboards to behave as automata. All that is needed is to disable all devices that generate non-reproducible events, such as real time clocks, and emulate them using software.

2. CE Initialization/Synchronization

In a conventional, fault intolerant SMP system, all processors become active simultaneously. Thereafter, at some point in the initialization process, all processors other than the primary processor are deactivated. Once the primary processor has set UP the system, the other processors are activated and normal SMP activity begins.

For fault tolerance, the activation process is carefully crafted, since it dictates the relative timing between the processors. In particular, the system alignment is adjusted to a known state. This requires memory refresh, PCI clocking, interrupt clocking, interrupt arbitration, CPU arbitration, I/O interactions, and all CPU caches to be in a known state.

The CPUs are started with exactly the same state information. This is achieved through a synchronization process. In particular, the memory contents of the running CE are copied over to the synchronizing CE. Once the memory contents are copied, the processor state is transferred. Both processors then execute a power fail recovery type sequence and restore their context from the memory image.

The uni-processor system is not sensitive to cache, branch prediction, and translation buffer contents. An SMP system will be sensitive to these. One technique for initializing these subsystems is to initiate a full processor reset, which may require custom BIOS to restrict the restart time. Another technique is to execute an algorithm that forces known values into these subsystems.

Figure 5:
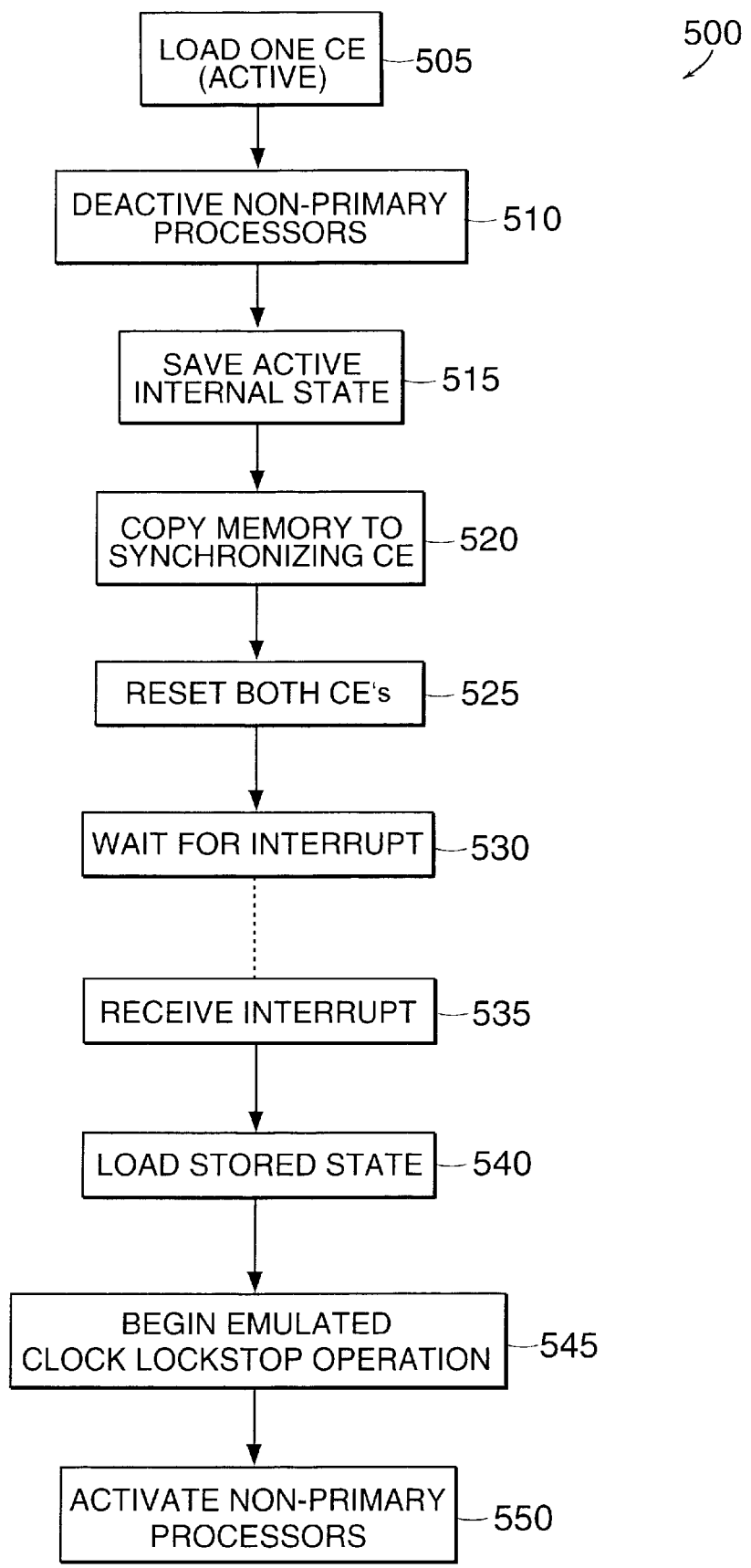
FIG. 5 is a flow chart of a procedure implemented by the system of FIG. 3.

Referring to FIG. 5, CE initialization/synchronization is performed according to a procedure 500. First, one CE is loaded with operating system software, application software, and system control software (step 505). This CE is referred to as the active CE, while the other CE is referred to as the synchronizing CE. Activation of the active CE typically includes deactivation of all processors but the primary processor (step 510).

Next, the internal state of the active CE is saved in the memory 325 (step 515). When the other processors have been deactivated, the internal state includes just the internal state of the primary processor. Any internal values stored in the arbitration unit 320 and the interface card 335 also may be saved in the memory. The contents of the active CE's memory 325 then are copied to the synchronizing CE (step 520).

After the state of the active CE is transferred, both CEs execute a reset procedure (step 525). The reset procedure clears the internal state of each processor 310, including all caches, but leaves intact the memory 325, which contains the saved state of the active CE.

After executing the reset procedure, the CEs wait for a software interrupt (step 530). The interrupt is delivered to both CEs simultaneously. Upon receiving the interrupt (step 535), the primary processor of each CE loads the stored state from memory (step 540) and begins emulated clock lockstep operation (step 545). This operation may include activation of the other processors of the CE (step 550).

In general, the mechanisms described above require all motherboard clocks to have a common base frequency, and further require that the clocks can be phase aligned under software control. In addition, the motherboard must be capable of clearing all processor states under software control without a full motherboard reset, which would also clear the memory 325. This may be achieved through a hardware reset mechanism that permits the processor to be reset without resetting the I/O devices and the memory. A relatively more difficult way of achieving this is to modify the BIOS to allow reestablishment of connections to memory and I/O after a full motherboard reset. This would require the processor to snapshot all tables and other necessary parameters prior to performing the reset.

3. Controlling the Divergence of CE Stimuli due to Asynchronous Behavior

There are two fundamental sources of asynchronous behavior: asynchronous clocks and non-synchronized events. Asynchronous clocks are found in video controllers, real time clocks, and I/O devices. They are inherently imprecise mechanisms that cannot be tolerated between replicated fault resilient/fault tolerant computers.

I/O requests by the CEs are intercepted and handled by the IOPs 330, and quantum interrupts are used to periodically update the real time clocks of the CEs. Quantum interrupts are interrupts generated after execution of a fixed number of clock cycles.

The SMP system 300 provides for totally synchronous I/O. This means that all accesses to the interface card 335 connecting a CE 305 to the IOPs 330 must occur in a reproducible manner. This requires guaranteed timing as viewed from the PCI bus, DMA that is aligned to some CPU controllable event, data availability that is synchronous to the CPU instruction stream across all instances, and restricted use of polling activity.

Figure 6:
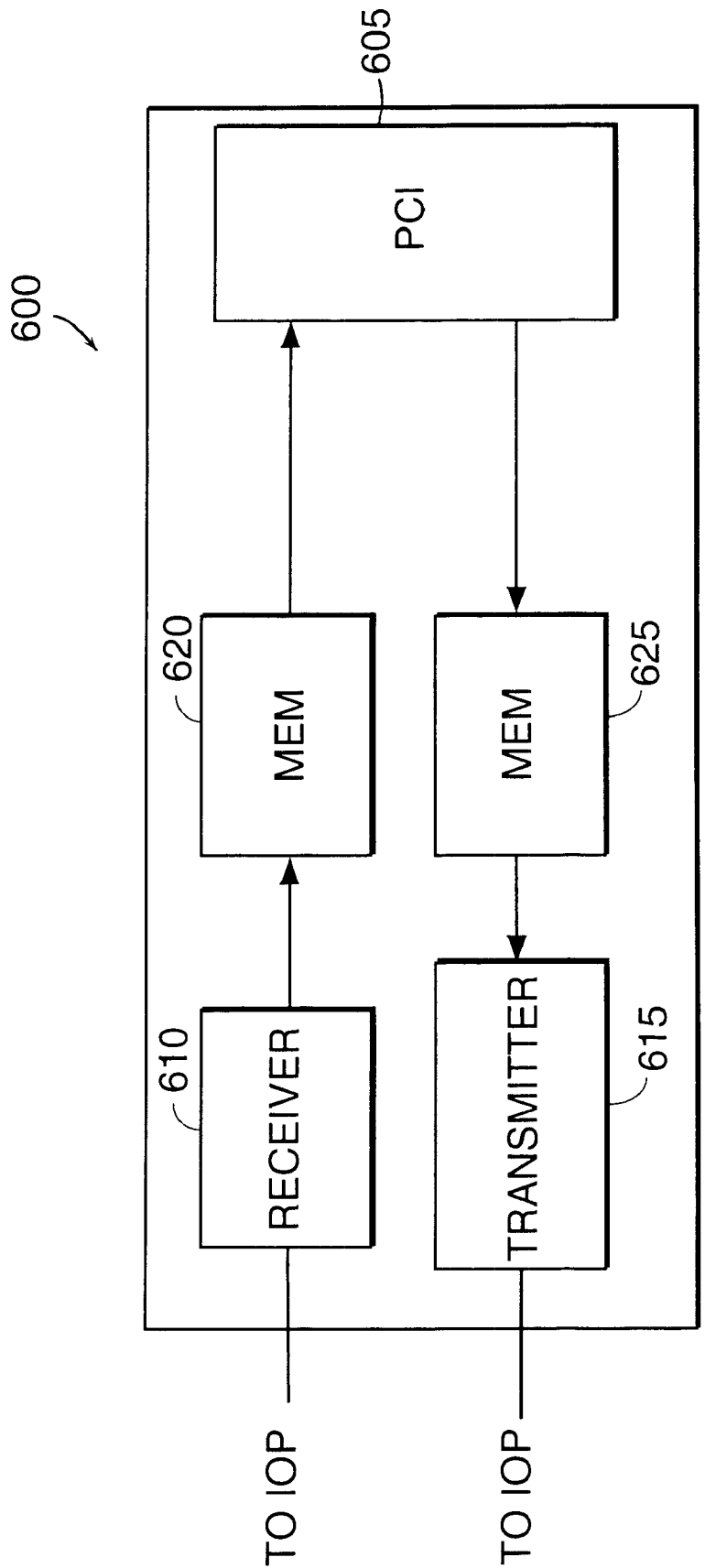
FIG. 6 is a block diagram of a PCI interface.

The input and output to the CEs are controlled through software and a PCI interface module of the interface card 335. FIG. 6 illustrates the PCI interface module 600. The module 600 includes a PCI section 605 that operates synchronously to the arbitration unit 320 and the processors 310 of the CE 305. The module 600 also includes a receiver section 610 and a transmitter section 615 that operate synchronously with the IOP 330 to which they are connected. A reception memory 620 and a transmission memory 625 act as the interface between the sections. Each memory functions as a dual-ported memory.

The transfer from the asynchronous timing of the IOP to the CE clocking is done through the use of a hardware protocol (referred to as a freeze protocol) implemented by the interface card 335. In an SMP implementation, any polling activity with the interface card 335 contributes to asymmetric operation between the CEs 310. The freeze protocol ensures that data will not be transferred from one of the interface memories until all of the data is in the memory of each CE.

When implementing the freeze protocol, the CEs, which are processing an identical instruction stream, each stop processing of the instruction stream at a common point in the instruction stream. Each CE then generates a freeze request message and transmits the freeze request message to the IOPs. An IOP receives a freeze request message from a CE, waits for a freeze request message from other CEs, and, upon receiving a freeze request message from each CE processing an identical instruction stream, generates a freeze response message and transmits the freeze response message to the CEs. Each CE, upon receiving a freeze response message from an IOP, waits for freeze response messages from other IOPs to which a freeze request message was transmitted, and, upon receiving a freeze response message from each IOP, generates a freeze release message, transmits the freeze release message to the IOPs, and resumes processing of the instruction stream (and transmission of data from the reception memory). The interface card 335 and the freeze protocol are configured so as to avoid disturbing the caches, TLB and BTB in the Intel Pentium Pro processor. The freeze protocol is discussed in more detail in U.S. Pat. No. 5,790,197, titled "FAULT HANDLING", which is incorporated by reference.

Video operations exhibit asynchronous behavior due to the oscillator on the video card, which has no correlation with the CPU clock. Video controls are derived from this oscillator. Additionally, the video drivers execute code that is dependent on polling I/O registers. Techniques for eliminating asynchronies associated with video include creating a video module with guaranteed timing, re-directing the video like other I/O, and creating a virtual video module that isolates the asynchronous timing of the actual video module.

Non-synchronized events may occur whenever different clock rates are derived from a common oscillator. For example, a 66 MHz processor clock may be divided down to derive a 33 MHz PCI clock. In this case, since the processor clock is twice as fast as the PCI clock, every second processor clock cycle aligns with a PCI cycle. Similarly, memory refresh is triggered approximately every 15 microseconds by dividing the processor clock by 1000, which means that the processor clock will align with the memory once every 1000 processor clock cycles. To guarantee reproducibility, each CE must be started with the same alignment of these normally non-synchronized elements.

Interrupts also must be configured to be synchronous with the processor. This is done by implementing the motherboard so that interrupt clocking is synchronous to the PCI clock, which, as noted above, is aligned with the CPU-clock.

In general, Marathon's Endurance 4000 system used only one interrupt, which was produced based on instruction stream execution. The performance counter was tied in through the local APIC to produce an interrupt after a given number of instructions had been executed. The generation of the interrupt was synchronous to the instruction stream, but the delivery was not guaranteed to be synchronous. Part of the uncertainty resulted from the choice of an APIC clock, which can be made synchronous to the CPU clock. To remove this uncertainty in the system 300, the clocking structure of the local APIC and its interface to the processor are used to retime the interrupt such that all uncertainty in its delivery is removed.

In most industry standard motherboards, memory refresh is synchronous to the CPU clock but it is asynchronous to the instruction stream. For these motherboards, there is no direct correlation between CPU execution and memory refresh. Memory refresh alters the timing of memory access between systems unless it is started off with the same alignment on both systems. For this reason, memory refresh also is controlled. This may be achieved through a chip set modification that establishes an I/O location that produces refresh activity in response to a read so as to permit refresh alignment to be forced from software. As an alternative, alignment can be inferred from refresh activity and made visible to the CPU. Yet another alternative makes refresh occur a fixed number of cycles after refresh is enabled.

Unlike the uni-processor system, the multi-processor system must control bus arbitration. The uni-processor system is able to ignore the effects of bus arbitration by aligning the instruction streams. Bus arbitration control is unnecessary because there is no combination of arbitration between a single processor, memory, and I/O that will produce a different result for a well-behaved program, since such a program will not allow shared access to memory that is being written by another entity.

This simple rule does not hold for multi-processor systems. There are algorithms that use two or more processors and permit all processors to read or write a single location for the purpose of loosely tracking system metrics. Other algorithms permit multiple processors to read and modify memory locations to gain exclusive access to a larger data structure without using bus lock structures. Thus, any change in the arbitration order between processors may have a dramatic effect on the contents of memory, which violates the reproducibility constraint. Accordingly, a multi-processor system must effectively control bus arbitration.

A first approach to controlling bus arbitration adjusts the inter-processor relationship. This approach is very complex because every internal caching mechanism in the processors affects the relationship between the processors at the bus arbitration boundary.

A simpler approach for controlling bus arbitration is to reset the processors after every execution interruption. This avoids algorithm complexities at the expense of effectively disabling all caching mechanisms since the caches are flushed on every reset.

Bus arbitration is a general problem at every bus in the system. The CPU to cache, CPU to memory, CPU to PCI, and PCI to ISA buses share this problem. All these buses are synchronous to the CPU clock, but each is controlled by a divide ratio. Therefore, each must be aligned to remove timing variations. Again, the alignment can be inferred or made controllable with a chip set modification.

The CPU caches use a pseudo-random allocation policy that is controlled by allocation requests. The allocation policy must be aligned if cache divergence is allowed to occur.

DMA activity affects the arbitration of system buses. The DMA engine needs to be started and stopped based on the alignment of the system buses to avoid uncertainty. The MIC uses DMA to transfer data from the CE's memory to the PCI bus and ultimately to the IOP. Another, less efficient approach, to accounting for DMA involves halting the processors while DMA is underway.

In a CE configured for emulated clock lockstep operation, there are four kinds of stimuli to the motherboard: clocks, interrupts, data input, and other asynchronous events. Each kind of stimuli is discussed below.

a. Controlling Clocks

A typical motherboard includes several clocks. The core clock drives internal processor circuits. The processor bus clock, also called the front side bus or FSB clock, controls operation of the processor bus. The memory refresh clock, which is often derived from the FSB clock, controls memory refresh. The PCI bus clock controls operation of the PCI bus. Finally, the interrupt controller clock, also called the APIC clock, controls the timing of interrupts. Alignment of all of these clocks can be guaranteed by deriving all of them from a single oscillator.

b. Controlling Interrupts

In the CEs, both the interrupts themselves and the interrupt delivery mechanism must be controlled. The system 300 only needs three interrupts: the processor counter interrupt, the inter-processor interrupt, and the MIC interrupt. The processor counter interrupt initiates the transition from clock lockstep (normal mode) operation to instruction lockstep (system mode) operation. The inter-processor interrupt coordinates the transition from clock lockstep (normal mode) operation to instruction lockstep (system mode) operation. The MIC interrupt controls DMA transfers and transitions from instruction lockstep (system mode) operation to clock lockstep (normal mode) operation.

The synchronous delivery of all interrupts requires that the APIC clock be synchronous as well as synchronizable to the other clocks. While the synchronous requirement can be met by deriving all clocks from the same oscillator, the ability to synchronize the APIC clock using software control is dependent on the specifics of the motherboard components. The APIC clock also must have appropriate skew to avoid divergence.

c. Controlling Data Input

Input data delivery is made synchronous using custom circuitry in the MIC. Data transitions between the IOP MIC and the CE MIC are based on the clock of the transmitter. The CE MIC accumulates data from the IOPs while the CE is in clock lockstep (normal mode) operation and makes the data available to the CE when the CE is in instruction lockstep (system mode) operation. The CE MIC is designed so that DMA data transfers executed while the CE is in clock lockstep (normal mode) operation will be synchronous to the instruction stream.

d. Uncontrolled Events

Some events are inherently uncontrolled. These events are related to error conditions and alarms, and will cause divergence of the CEs if they are allowed to occur. Examples of these events include system management ("SMI") interrupts, such as those used, for example, for power management, and nonmaskable ("NMI") interrupts, such as those associated with double bit memory errors. The system control software disables the CE motherboard SMI interrupt. Events that are reported through the SMI interrupt are monitored by the CEs using the IOPs as a filter. The CEs periodically read the SMI pending register and transfer the data to the IOPs. The IOPs then determine if an SMI interrupt is required and direct all CEs to execute an SMI algorithm based on the pending register value returned by the IOPs. The SMI activity is data divergent but not instruction divergent. The data divergence is handled while in instruction lockstep (system mode) operation.

One of the expected SMI events is related to ECC errors. The algorithms used in the memory controllers to handle correctable errors impact the frequency of CE divergence. For example, on the fly correction with no cycle penalty allows the CEs to continue without divergence. With this approach, the SMI code performs the write back correction at a future time. On the fly correction with a cycle penalty causes CE divergence. Automatic write back correction causes CE divergence. The more specific the error address is, the quicker the single bit error can be corrected.

NMI events tend to be fatal to the compute environment. The CE generates an error packet to the IOPs before letting the NMI interrupt occur. Thus, the IOPs are notified which CE is in error prior to detecting the resulting CE divergence. The IOPs respond to the CE error by disabling the CE.

4. CE Realignment

The system realigns the CEs to account for clock drift between the CEs 305. Clock drift results because each CE uses its own oscillator, with a common oscillator being used for all processors of a CE. If left uncorrected, clock drift could cause the CEs to drift so far apart that they appear to no longer function correctly. The system 300 accounts for clock drift in a way that does not cause the processors to diverge.

Figure 7:
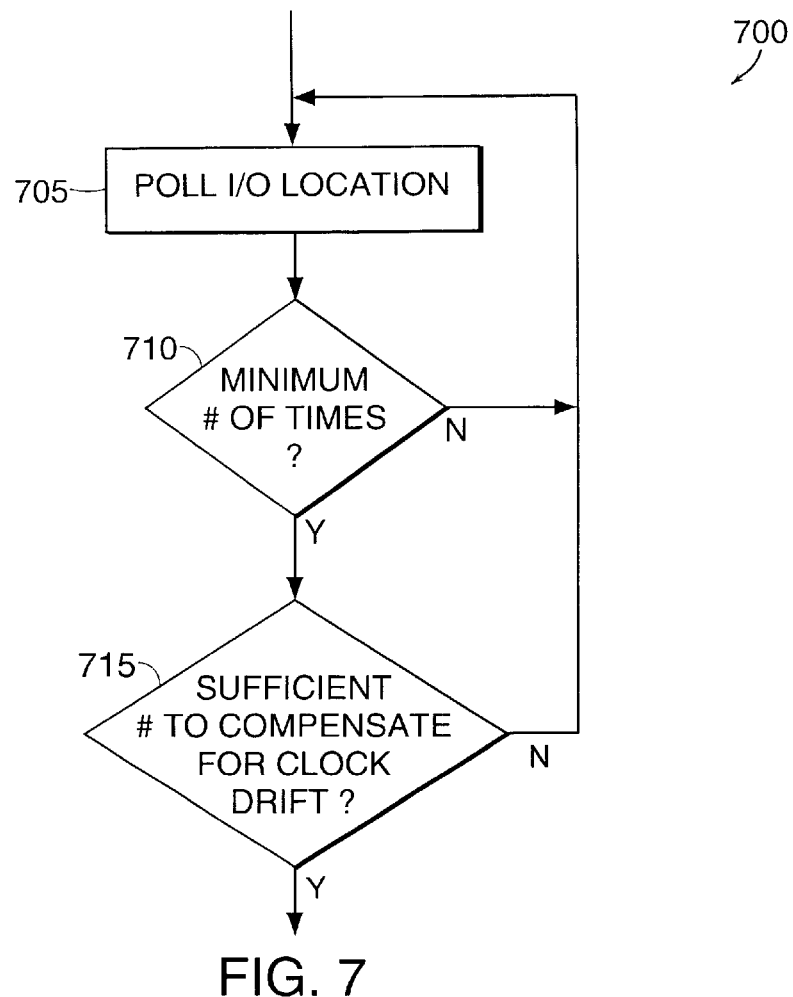
FIG. 7 is a flow chart of a procedure implemented by the system of FIG. 3.

In one approach, as illustrated in FIG. 7, the system uses a procedure 700 to have each CE periodically poll (step 705) an I/O location a different number of times. A minimum number of executions of the polling loop (step 710) ensures that all the caches of the processors remain consistent. For example, while one pass through the loop will establish the content of some caches (e.g., the L1 and L2 caches), multiple (e.g., four) passes may be required to force consistency in other caches or buffers (e.g., the Branch Target Buffer). After the required number of passes, each CE then executes the loop a number of times needed to compensate for clock drift (step 715). As this is a coarse grained correction, the system must be able to handle a clock skew the size of the grain (i.e., the size of the time taken to complete a loop).

Another polling technique has each CE poll the I/O location the same number of times. The results of the polls by a CE then are ORed together to produce a final result for the CE.

In another approach to coordinating the processors, the CEs enter a HALT state while waiting for I/O. On the completion of I/O, the CEs are interrupted. Either the interrupt is tied to the alignment of the system, or an alignment process is executed in the interrupt handler. In either case, the alignment between CEs is guaranteed on exit from the interrupt handler.

SMP CE Motherboard Requirements

A motherboard must have a number of features to support the synchronization of SMP CEs in the system 300. As noted above, the CEs operate in two modes: emulated clock lockstep and instruction lockstep. During emulated clock lockstep operation, the CEs execute the operating system and applications software. During instruction lockstep operation, the CEs execute system control software.

In emulated clock lockstep operation, the initial state and all inputs are guaranteed to be identical between motherboards. Both motherboards execute the same instruction stream in the same number of clock cycles. Execution proceeds uncontrolled for a pre-selected number of clock cycles.

Instruction lockstep mode is then entered. In instruction lockstep, both motherboards execute the sane instruction stream, but the number of clock cycles required is not consistent. During instruction lockstep, each CE communicates with its interface card 335 to negotiate synchronous input delivery. Compensation for clock drift between CE motherboards is also handled during instruction lockstep mode.

Returning to emulated clock lockstep mode requires realigning the clock structure of the motherboard with the instruction stream. Both motherboards will again present the exact same state during emulated clock lockstep mode.

The system 300 relies on being able to emulate the effect of clock lock step motherboards without actually building a phase locked clock structure between the motherboards. Emulating phase locked clocks eliminates the need to detect and control the interactions between the symmetric processors on a motherboard. A phase locked clock structure also removes all constraints on the coding style that the programmer uses when producing an SMP compliant application. This renders the system 300 operating system and application independent.

The features needed to provide the emulated phase lock structure include a single clock structure, a synchronous memory system, synchronizable memory refresh, a synchronous PCI bus, synchronous interrupt delivery, and the ability to perform a processor reset. Each of these requirements is described in more detail below.

1. Single Clock Structure

The major clocking structure for the motherboard must be derived from a single oscillator. The required clocks are the FSB clock, the PCI clock, and the APIC clock.

All of the clocks must be derived from a single oscillator. The FSB clock is the highest frequency, and is divided down to produce the PCI clock. The PCI clock is divided down to produce the APIC clock. The phase relationship between the FSB clock, the PC1 clock, and the APIC clock must be guaranteed.

Other devices and their respective clocks can be present on the motherboard, provided that they are disabled and that they do not impact the synchronous operation of the motherboard when they are disabled. Examples of potentially asynchronous onboard clocks include video, ethernet, SCSI, CMOS, and USB.

2. Synchronous Memory System

The two requirements for the memory system are that is must run synchronously to the FSB, and that state information in the memory system must be either self-clearing or controllable by software. Current North Bridge chipsets meet these requirements.

The first requirement is that memory must act like a state engine with predictable timing synchronous to the processor bus. An asynchronous memory system can not be used.

The second requirement is aimed at future chipsets. The memory interface is currently dealt with as an invisible block of logic. The timing is not dependent on a long history of past activity. Write buffers and cache structures are assumed not to require software intervention to maintain lockstep operation. Memory arbitration algorithms are assumed to be self-clearing based on idle activity at the memory interface. When a new structure that challenges these assumptions is added, a software technique for aligning the structure is required.

3. Synchronizable Memory Refresh

Normal memory refresh operations, such as the CAS-before-RAS (CBR) Refresh, are generated from a synchronous clock structure, but appear asynchronous to the instruction stream. When transitioning from instruction lockstep mode to emulated clock lockstep mode, the refresh operation must be realigned to the instruction steam under software control.

Many chipsets allow refresh to be disabled. This does not necessarily meet the requirement. The delay from when refresh is reenabled until the first refresh request occurs must be the same every time that refresh is reenabled. The simplest scheme for achieving this is to allow software to reset the counter that creates the refresh request.

The refresh rate has an impact on system functionality. Input is queued in the interface card 335 of the CE 305 until the CE is in instruction lockstep mode. When the CE returns to emulated clock lockstep mode, input data is transferred into the memory 325 of the CE. The more frequently the CE cycles through instruction lockstep mode, the lower the latency will be for I/O operations. Each transition from instruction lockstep mode to emulated clock lockstep mode requires refresh to be realigned, and the minimum time the CE can spend in emulated clock lockstep mode is constrained by the refresh rate. Therefore the I/O latency is constrained by the refresh rate.

4. Synchronous PCI Bus

The two requirements for the PCI bus are that it must run synchronously to the front side bus, both in frequency and phase, and that state information in the PCI bridge (i.e., the North Bridge) must be either self-clearing or controllable by software. Current North Bridge chipsets meet these requirements.

The only active device on the PCI bus is the interface card 335. The CPU performs I/O reads and writes to the interface card 335 while in emulated clock lockstep mode. The interface card 335 also performs DMA in and out of system memory while in emulated clock lockstep mode. The bus operations must be fully synchronous.

The PCI bridge is expected to have a limited set of write buffers and a short term arbitration scheme. The system software relies on an idle PCI bus being a sufficient condition to clear any past historical state information from the PCI bridge. If a new structure is added that challenges these assumptions, a software technique for aligning the structure is required.

5. Synchronous Interrupt Delivery

The system 300 uses three interrupts: the performance counter interrupt through the local APIC, the inter-processor interrupt using the local APIC, and a PCI interrupt from the interface card 335. All three interrupt sources must be synchronous with respect to the internal structure of the processor.

The APIC clock must provide interrupt delivery to the processor so that an interrupt can be used to align halted processors. In addition, the APIC clock must be skewed with respect to the FSB clock at the processor pins such that no uncertainty exists in the reception of an interrupt request.

6. Processor Reset

Current Intel processors include a number of internal structures that can only be cleared with a full processor reset. When two motherboards are first synchronized with each other, the context of the active CE processors related to the instruction stream is stored in main memory along with a restore procedure. A software-driven processor reset is issued to clear all processor internal structures. Thus, both motherboards are put in the same initial state before starting their emulated clock lockstep operation. The reset causes the processor to enter BIOS at the restart vector. Control is then transferred from the BIOS to the restore procedure, which runs in the instruction lockstep mode. The restore procedure then initiates emulated clock lockstep mode.

The motherboard must provide a feature for resetting the processors without destroying the context of the current instruction stream. The BIOS must provide a method of redirecting processor execution to a memory-resident recovery routine. Additionally, the processors must not have accessed any data or instruction divergent areas of the motherboard between the reset and the execution of the first instruction of the restore procedure.

An example of a suitable system is offered by the Intel 82443BX and PIIX4 chips. On the resume from a power-on suspend, the 82443BX generates a processor reset. The BIOS can be directed through CMOS location OFh to bypass POST. BIOS can also be directed to vector through memory location 40:67 to the restore code. This combination provides a clean method of clearing the processor history structures.

Simplified System

Figure 8:
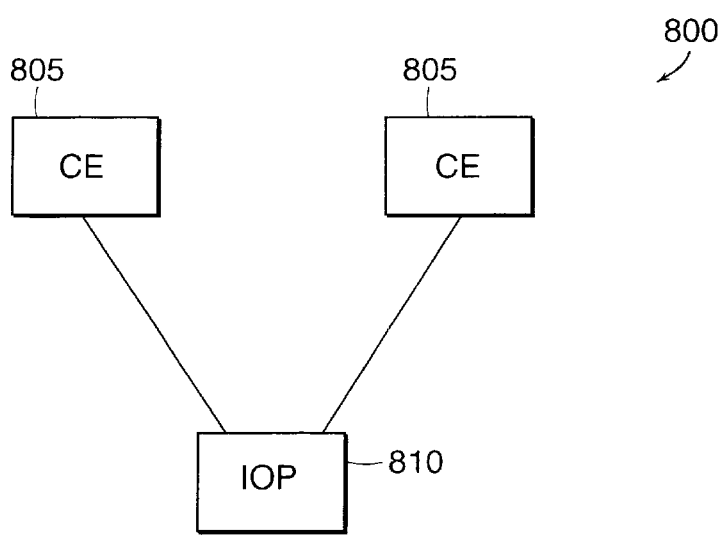
FIG. 8 is a block diagram of a system having two multi-processor compute elements and one I/O processor.

FIG. 8 illustrates a simplified system 800 useful for verifying and explaining concepts employed by the SMP system. The system 800 is a Y system with two CEs 805 and one IOP 810. Each CE 805 is a dual-processor system SMP having 32 MB of memory and a floppy drive. All other peripherals have been removed. A simple ISA module is attached to provide a controlled external interrupt. The IOP 810 is a uni-processor.

The IOP 810 is responsible for comparing the output results from the CEs. There is no re-directed I/O. The CEs run, and the IOP monitors their synchronization.

Figure 9A:
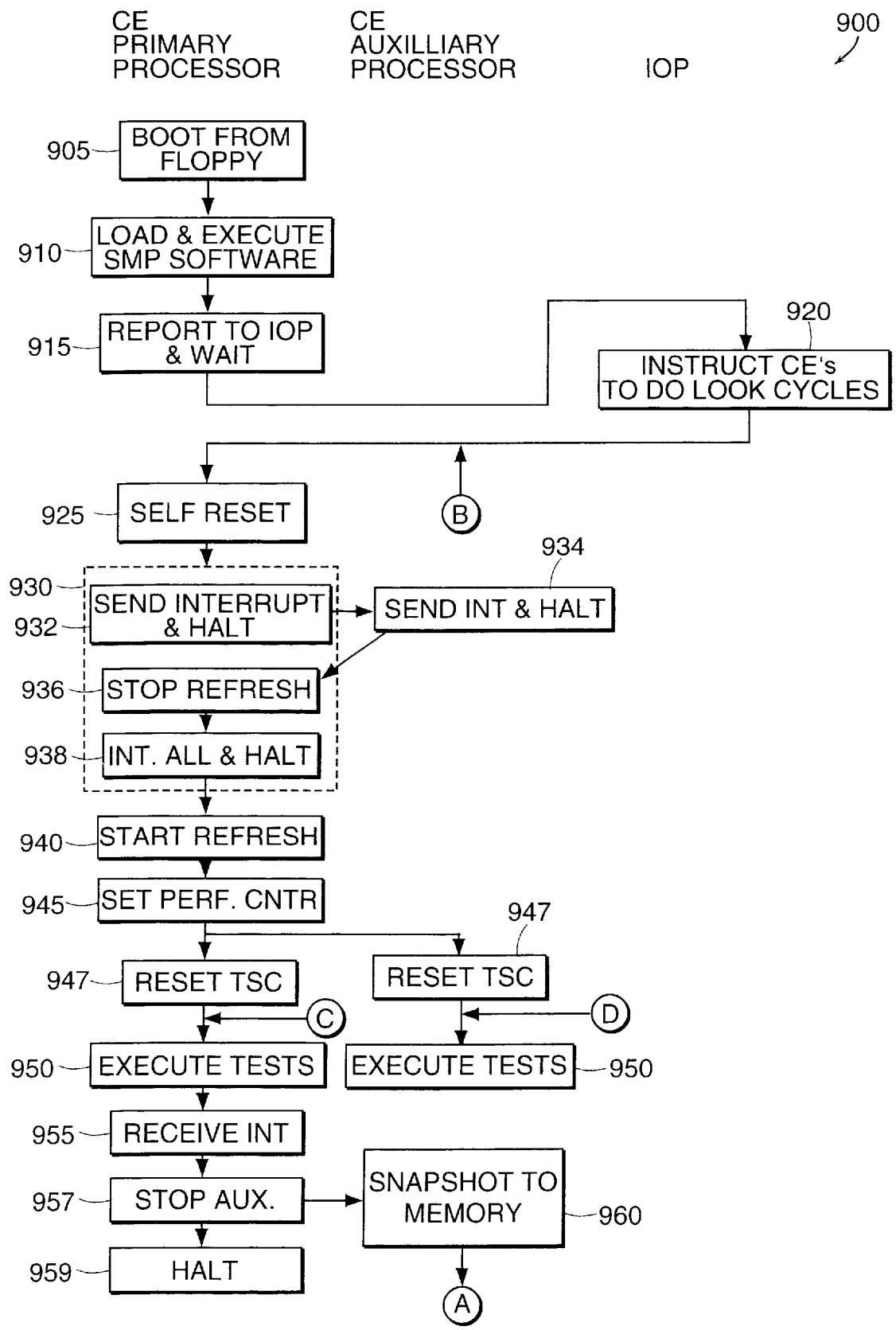
FIGS. 9A and 9B are a flow chart of a procedure implemented by the system of FIG. 8.
Figure 9B:
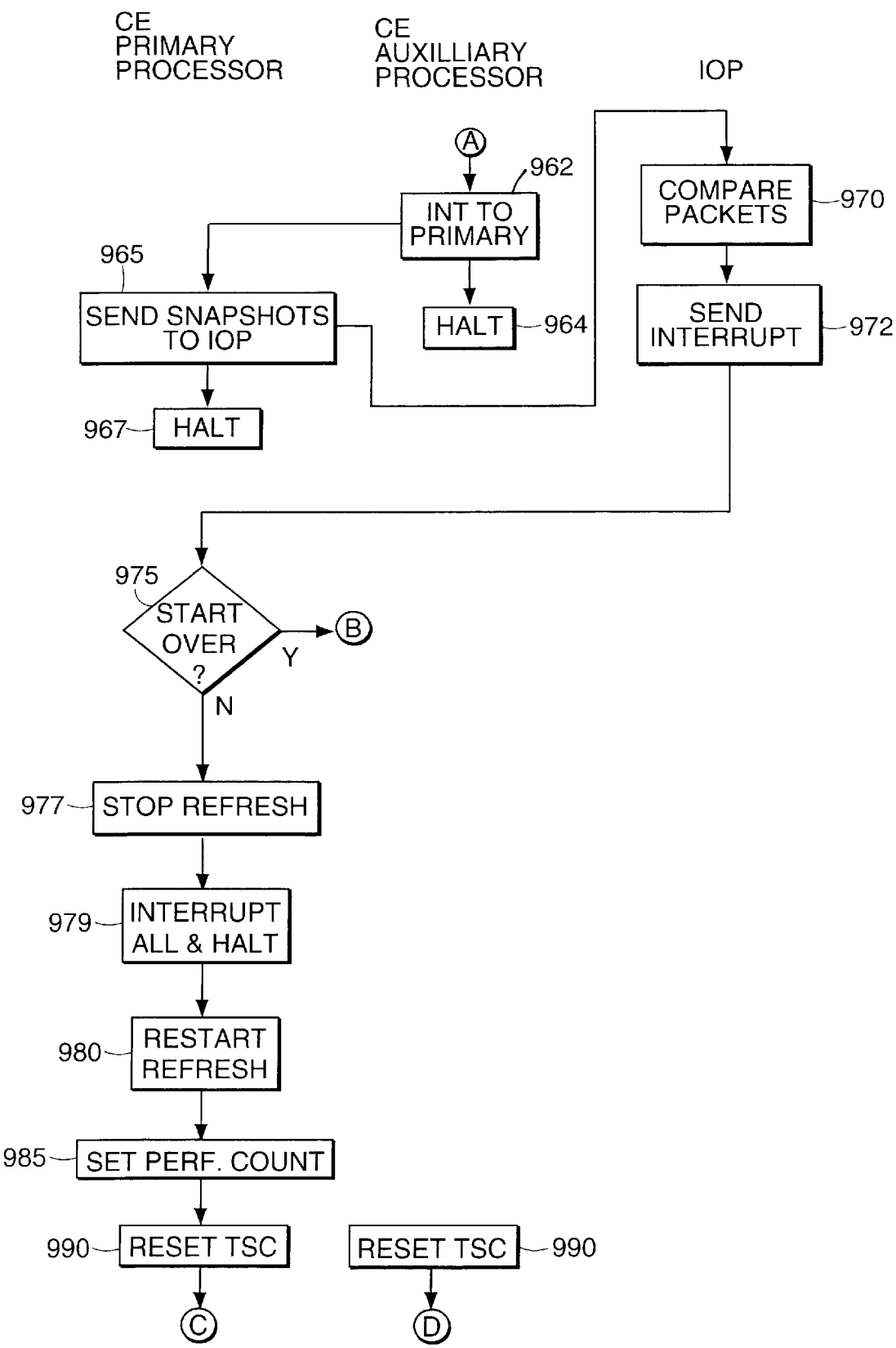

Referring to FIGS. 9A and 9B, the system 800 operates according to a procedure 900. First, the primary processor of each CE boots from its own floppy drive (step 905). The primary processor then loads and executes a custom program that includes both the SMP control software and the SMP application (step 910). This program causes each CE to report its status to the IOP and wait for a response (step 915).

The IOP responds by instructing the CEs to operate for 100,000 clock cycles and to then report back to the IOP (step 920). Upon receiving the response, each CE performs a self reset to purge the processors of divergent data structures (step 925).

The primary processor of each CE then executes an APIC wakeup sequence for the auxilliary processor (step 930). The primary processor does so by sending an interrupt to the auxilliary processor and halting (step 932). The auxilliary processor responds by sending an interrupt to the primary processor and halting (step 934).

Upon receiving the interrupt from the auxiliary processor, the primary processor in each CE stops memory refresh (step 936). The processor then issues an interrupt to all processors and halts (step 938).

Upon receiving the interrupt that it issued, the primary processor restarts refresh (step 940) and sets its performance counter for an interrupt after 100,000 clock cycles (step 945). Each processor then resets its time stamp counter ("TSC") (step 947). The time stamp counter counts the number of clock cycles occurring at the processor. The value of the counter is used by the IOP to monitor synchronization of the CEs.

Each CE then begins execution of a set of four tests that make unconstrained (no locks or semaphores) modifications to a 64,000 byte section of memory 325 (step 950). Both the primary processor and the auxilliary processor of a CE run the tests. The index variable that controls which test is run next is also unconstrained and accessed independently by the two processors of the CE.

At the completion of 100,000 clock cycles by the primary processor, the primary processor receives an interrupt (step 955). The primary processor responds by sending a snapshot of its registers and TSC to memory and sending an interrupt to stop the auxilliary processor using the APIC bus (step 957). The primary processor halts (step 959) after sending the interrupt.

The auxilliary processor responds to the interrupt by sending a snapshot of its registers and TSC to memory (step 960), sending an interrupt to the primary processor (step 962), and halting (step 964).

The primary processor responds to the interrupt by sending its own snapshot and the auxilliary processor's snapshot to the IOP for comparison (step 965) and halting (step 967). The send is a rate-based serial transmit, in which the processor sends a character and waits x instruction loops. This avoids polling the serial port. The send also could be done using a send/halt interrupt scheme.

The IOP compares the packets from the CEs (step 970). The IOP then sends a single character interrupt to the CEs (step 972). If the packets from the CEs are the same, the interrupt tells the CEs to continue. Otherwise, the interrupt tells the CEs to start over.

If the interrupt tells the CE to start over (step 975), the primary processor begins again with step 925. If the interrupt tells the CE to continue (step 975), the primary processor stops memory refresh (step 977). The primary processor then issues an interrupt to itself and the auxilliary processor and halts (step 979). The primary processor generates the interrupt because, in the process of communicating with the IOP, the CEs have diverged in time. The interrupt serves to reactivate the auxilliary processor and to realign the instructions of the processors with the clocking structure of the CEs. The interrupt must be based on the lowest frequency clock of the clocking structure. This may be a clock generated in the interface card of the CE. In some systems, it may be the APIC clock.

Upon receiving the interrupt that it issued, the primary processor restarts refresh (step 980) and sets its performance counter for an interrupt after 100,000 clock cycles (step 985). Each processor then resets its time stamp counter ("TSC") (step 990), and the processors proceed with step 950.

The system 800 operates in three modes of operation: divergent, timing divergent (instruction lockstep), and emulated clock lockstep. In the divergent mode, there is no correlation between what the different CEs execute. In the timing divergent mode, both CEs execute the same instruction stream but with a different number of clock cycles. Finally, in the emulated clock lockstep mode, both CEs execute exactly the same instructions at exactly the same clock cycles. In the procedure 900, steps 905–925 are divergent, steps 930–938 and 970–979 are timing divergent, and steps 940–967 and 980–990 are emulated clock lockstep.

The system 800 takes two asynchronous SMP CEs 805 and make them behave as if they were clocked synchronously. This requires controlling all sources of asynchronous behavior and also compensating for the frequency difference between the CEs. The intent of the system 800 is to verify that this concept works, without requiring implementation of the entire hardware and software structure necessary for a product.

Major sources of asynchronous behavior originate from memory refresh, bus arbitration, cache line fill algorithms, branch prediction, interrupt delivery, DMA activity, I/O polling, and video refresh. These can be controlled by proper initialization and by not allowing divergent code execution. The sources of asynchronous and/or divergent behavior are addressed below.

1. Context Coordination

In an emulated clock lockstep SMP implementation, divergent code results in excessive overhead necessary to resynchronize the CEs. The system 800 overcomes the handicap of using divergence oriented interface hardware.

2. Memory Refresh

Memory refresh is an automatic activity controlled by the CPU/PCI bridge chip set. Memory refresh is known to cause divergence between instances of an SMP system because it modifies the access time for memory. This eventually results in reordering of the interlocks between processors. Refresh can be easily realigned with a minor modification in the bridge chip set. The system 800 removes refresh interaction by turning off refresh. As long as all pages of memory are accessed frequently enough, memory content will not be lost. The refresh interval for DRAM chips is typically specified as 8 milliseconds. However, longer refresh intervals have generally been successful.

In the system 800, memory can be refreshed in one of two ways. Either a hurry up refresh rate can be programmed, or a CPU directed memory walk can be performed. In such a memory walk, the application is responsible for sweeping through the pages of memory to keep the DRAM cells alive. An alternative is to sense the alignment of refresh and to hold off processor activity until the proper alignment is reached. This is not an option for an actual product since this would entail throwing away 16 microseconds on each quantum interrupt.

3. Bus Arbitration

The I/O buses in a machine are synchronous to the CPU clock. The bus clocking is derived from the CPU clock through a divider. To keep the SMP motherboards operating together, the processors always start off on the same divide count.

4. Cache Line Fill Algorithms

The goal is to not affect the cache line fill. The initial boot and load process will most likely disturb caching. Even if the same data is in cache, it may be present in different lines of the cache. The cache can be flushed using a processor reset operation. As an alternative, a flush algorithm that provides guaranteed cache results at its completion can be used. When used, this algorithm is performed after the application has loaded.

5. Branch Prediction

The branch prediction logic is another form of caching. It is sensitive to slightly different factors than a normal cache. Branch prediction has a content based on the recent history of branches. An instruction cache is modified on the first pass through a loop. Branch prediction is modified based on how many times a particular branch is taken. The branch prediction logic can be cleared using the processor reset operation. As an alternative, algorithm that uses polling without leaving the branch table divergent can be used.

6. Clock Drift Adjustment

The CEs operate as if in clock lock step. Each CPU takes exactly the same number of clock cycles to do the same job. Since the clocks are not frequency locked, the CEs diverge in time, but not in function. A gross exaggeration would have one CE running at 62 MHz and the other at 58 MHz for a nominal 60 MHz system. At the end of a second, one CE is four million cycles behind the other. This can be remedied by wasting time in the faster CE without causing divergence. One technique is to execute a do nothing loop in both processors, with one processor executing it just enough to reorder the branch prediction and caches, and the other processor executing it until the designated clock cycles have been wasted.

7. Interrupt Delivery

Interrupts are controlled by a different clock than the CPU clock. This interrupt clock is made synchronous to the CPU clock. As with bus arbitration, the processors are aligned to the interrupt clock.

8. DMA Activity

Data is moved from main memory to MIC memory in a way that does not affect the relationship of the processors. DMA is started synchronously to some activity that is understood by both the CEs and their MICs. In the system 800, this means that DMA is only allowed when the processors are halted, which avoids interaction.

9. I/O Polling

Any attempt to access data outside the CE may result in potentially divergent behavior. One solution to this problem is to incorporate the algorithm for branch prediction along with a custom MIC. The system 800 solves this problem by severely restricting I/O. The CPU/MIC interface is handled as a half duplex link with HALT and interrupt being used as the semaphores.

Other embodiments are within the scope of the following claims.

What is claimed is:

1. A fault tolerant/fault resilient computer system, comprising:
 at least two compute elements; and
 at least one controller connected to the at least two compute elements;
 wherein:
  each of the compute elements has clocks that operate asynchronously to clocks of the other compute elements,
  the compute elements each execute a stream of instructions,
  upon issuing an I/O request instruction from the stream of instructions, each compute element enters a halted state, and
  each compute element is removed from the halted state by an interrupt generated upon completion of the I/O request instruction.

2. The system of claim 1, wherein timing of the interrupt is controlled such that operation of the compute elements is synchronized upon generation of the interrupt.

3. The system of claim 1, wherein each compute element executes an alignment process in response to the interrupt, the alignment process serving to synchronize operation of the compute elements.

4. The computer system of claim 1, wherein the at least two compute elements each comprise a multi-processor compute element.

5. The computer system of claim 4, wherein the at least two compute elements each comprise a symmetric multi-processor (SMP) compute element.

6. The computer system of claim 4, wherein each compute element is implemented using an industry standard motherboard.

7. The computer system of claim 1, wherein each compute element comprises a processor, memory, and a connection to the controller.

8. The computer system of claim 7, wherein each compute element is configured so that refresh operations associated with the memory are synchronized with execution of operations by the processor.

9. The computer system of claim 7, wherein the system is configured to synchronize compute elements by:
 copying contents of the memory of a first compute element to the memory of a second compute element; and resetting the processors of the first and second compute elements without affecting the memories of the compute elements.

10. The computer system of claim 1, wherein the system is configured to redirect I/O operations by the compute elements to the controller.

11. The computer system of claim 1, further comprising a second controller connected to the first controller and to the at least two compute elements.

12. The computer system of claim 11, wherein the first controller and a first one of the compute elements are located in a first location and the second controller and a second one of the compute elements are located in a second location, and further comprising a communications link connecting the first controller to the second controller, the first controller to the second one of the compute elements, and the second controller to the first one of the compute elements.

13. The computer system of claim 12, wherein the first location is spaced from the second location by more than 5 meters.

14. The computer system of claim 12, wherein the first location is spaced from the second location by more than 100 meters.

* * * * *